United States Patent

Blount et al.

(10) Patent No.: US 9,329,954 B2
(45) Date of Patent: *May 3, 2016

(54) FALSE POWER FAILURE ALERT IMPACT MITIGATION

(71) Applicant: INTERNATIONAL BUSINESS MACHINES CORPORATION, Armonk, NY (US)

(72) Inventors: Lawrence C. Blount, Tucson, AZ (US); Itzhack Goldberg, Hadera (IL); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,611

(22) Filed: Jul. 31, 2015

(65) Prior Publication Data
US 2015/0339203 A1 Nov. 26, 2015

Related U.S. Application Data

(63) Continuation of application No. 13/733,195, filed on Jan. 3, 2013, now Pat. No. 9,164,929.

(51) Int. Cl.
G06F 12/00 (2006.01)
G06F 11/20 (2006.01)
G06F 12/16 (2006.01)
(Continued)

(52) U.S. Cl.
CPC .......... *G06F 11/2069* (2013.01); *G06F 3/0619* (2013.01); *G06F 3/0625* (2013.01); *G06F 3/0653* (2013.01); *G06F 3/0679* (2013.01); *G06F 3/0689* (2013.01); *G06F 11/0727* (2013.01); *G06F 11/0787* (2013.01); *G06F 11/1441* (2013.01); *G06F 12/0802* (2013.01); *G06F 12/0804* (2013.01); *G06F 12/0868* (2013.01); *G06F 12/16* (2013.01); *G06F 11/2015* (2013.01); *G06F 2201/86* (2013.01); *G06F 2212/1032* (2013.01);
(Continued)

(58) Field of Classification Search
USPC ........................................................ 711/103
See application file for complete search history.

(56) References Cited

U.S. PATENT DOCUMENTS 7,380,055 B2    5/2008  Ashmore
7,536,506 B2    5/2009  Ashmore et al.
(Continued)

OTHER PUBLICATIONS

Dave Raffo, "Seagate Delivers Enterprise Solid-State Drives with SLC and MLC Flash", Mar. 15, 2011, pp. 1-2 TechTarget.
(Continued)

*Primary Examiner* — Matthew Bradley
(74) *Attorney, Agent, or Firm* — Griffiths & Seaton PLLC

(57) ABSTRACT

Various embodiments of the present invention that include receive a signal indicating a loss of power, start a timer, the timer configured to expire after a specific time period, copy write cache data from the volatile memory to a solid state device (SSD), upon receiving the signal indicating the loss of power to the storage system, configure the SSD as both a read cache and the write cache, perform a health test on the storage system, determine the loss of power as a false alarm if the timer expires and the storage system passes a health test on the storage system upon receiving the signal indicating the loss of power, and upon the timer expiring and the storage system passing the health test, copy the write cache data from the SSD back to the volatile memory.

10 Claims, 3 Drawing Sheets

(51) Int. Cl.
*G06F 3/06* (2006.01)
*G06F 11/07* (2006.01)
*G06F 12/08* (2016.01)
*G06F 11/14* (2006.01)

(52) U.S. Cl.
CPC .. *G06F 2212/2022* (2013.01); *G06F 2212/214* (2013.01); *G06F 2212/221* (2013.01)

(56) References Cited

U.S. PATENT DOCUMENTS

| | | | |
|---|---|---|---|
| 7,733,712 | B1 | 6/2010 | Walston et al. |
| 8,706,957 | B2 | 4/2014 | Caraccio et al. |
| 8,713,280 | B2 | 4/2014 | Anderson et al. |
| 2004/0153694 | A1 | 8/2004 | Nicholson et al. |
| 2010/0153666 | A1 | 6/2010 | Emaru et al. |
| 2013/0205065 | A1 | 8/2013 | Kloeppner et al. |
| 2013/0254457 | A1 | 9/2013 | Mukker et al. |

OTHER PUBLICATIONS

Method and System for Managing One or More Solid State Drives (SSD) Devices.

Method of Reducing Power Consumption of Solid State Drives.
The fast hard drive alternative that protects your data-Smart meet fast.

FALSE POWER FAILURE ALERT IMPACT MITIGATION

CROSS-REFERENCE TO RELATED APPLICATIONS

This Application is a Continuation of U.S. patent application Ser. No. 13/733,195, filed on Jan. 3, 2013, now U.S. Pat. No. 9,164,929, the contents therein hereby incorporated by reference.

FIELD OF THE INVENTION

The present invention relates generally to data storage, and specifically to mitigating false alarms of power conditions, by configuring a solid state drive as a write cache.

BACKGROUND

When processing I/O requests, computer storage systems typically implement read and write caches in order to enhance performance. A read cache typically comprises high-speed memory that is configured to store data that was recently retrieved from a disk, plus data that the computer system anticipates will be requested in the near future.

For example, if a storage system receives a read request to retrieve data from a specific physical region of a storage device, in addition to processing the retrieval request, the computer system may also retrieve physical regions on the storage device that follow the specific region, and load the retrieved physical regions to the read cache. In operation, if a host computer issues a read request for data that is currently in the read cache, then the storage system conveys the data directly from the read cache to the host computer, thereby eliminating the need to physically retrieve the data from the disk. Read performance is therefore enhanced, since retrieving data from the read cache is much faster than retrieving the data from the disk.

When processing a write request received from a host computer, the storage system stores the write request data in the write cache, and then conveys an acknowledgement to the host computer that the data has successfully been written to the disk. Upon receiving the acknowledgement, the host computer can proceed as if the data has successfully been written to the disk. In operation, the storage system is configured to destage (i.e., transfer) data from the write cache to the disk at a subsequent time, typically when the write cache reaches a specific utilization level. Write performance is therefore enhanced, since the write cache data (comprising data from multiple write requests) can usually be transferred to the disk in a smaller number of physical write operations than would have been required had each write request been individually stored to the disk.

SUMMARY

There is provided, in accordance with an embodiment of the present invention a distributed storage system, including a volatile memory configured as a write cache, and a processor configured to receive a signal indicating a loss of power, start a timer, the timer configured to expire after a specific time period, copy write cache data from the volatile memory to a solid state device, upon receiving the signal indicating the loss of power to the storage system, configure, subsequent to copying the write cache data, the solid state device as both a read cache and the write cache, perform a health test on the storage system upon receiving the signal indicating the loss of power, determine the loss of power as a false alarm if the timer expires after one of configuring the solid state device as both the read cache and the write cache and the storage system passes a health test on the storage system upon receiving the signal indicating the loss of power, and upon the timer expiring and the storage system passing the health test, copy the write cache data from the solid state device back to the volatile memory.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The disclosure is herein described, by way of example only, with reference to the accompanying drawings, wherein.

DETAILED DESCRIPTION OF EMBODIMENTS

Storage systems typically implement read and write caches in volatile memory to improve input/output (I/O) performance. In the event of a power failure, any data in the caches is at risk of being lost when the power is interrupted. To mitigate the risk of cache data loss, storage systems may include a standby power source such as an uninterruptible power supply (UPS) that is configured to provide power to the storage system in the event of a power failure.

When the UPS starts providing power to the storage system, the storage system receives a power alert. In response to the received power alert, the storage system prevents data loss by destaging data in the write cache (also referred to herein as write cache data) to disk(s), and then powering down the storage system.

There may be instances when the storage system receives a false power alert and unnecessarily initiates a shutdown. Embodiments of the present invention provide methods and systems for mitigating false alarms of power conditions, by configuring, upon receiving a power alert, a solid state device as a write cache. In some embodiments, the solid state device may comprise a solid state drive (SSD). As described hereinbelow, upon receiving a power alert, the storage system can copy the write cache data from volatile memory to the SSD, and then configure the SSD as the write cache.

The SSD typically comprises a data storage device that uses integrated circuit assemblies as memory to store data persistently. For example, the SSD may comprise NAND-based flash memory. Since data stored in the SSD is persistent (i.e., immune to power loss), the write cache data is retained if the storage system shuts down when the UPS runs out of power. However, if the storage system detects that the power alert is a false alarm, the storage system can copy the write cache data back to the volatile memory and reconfigure the volatile memory as the write cache (i.e., the original configuration before receiving the power alert).

Figure 1:
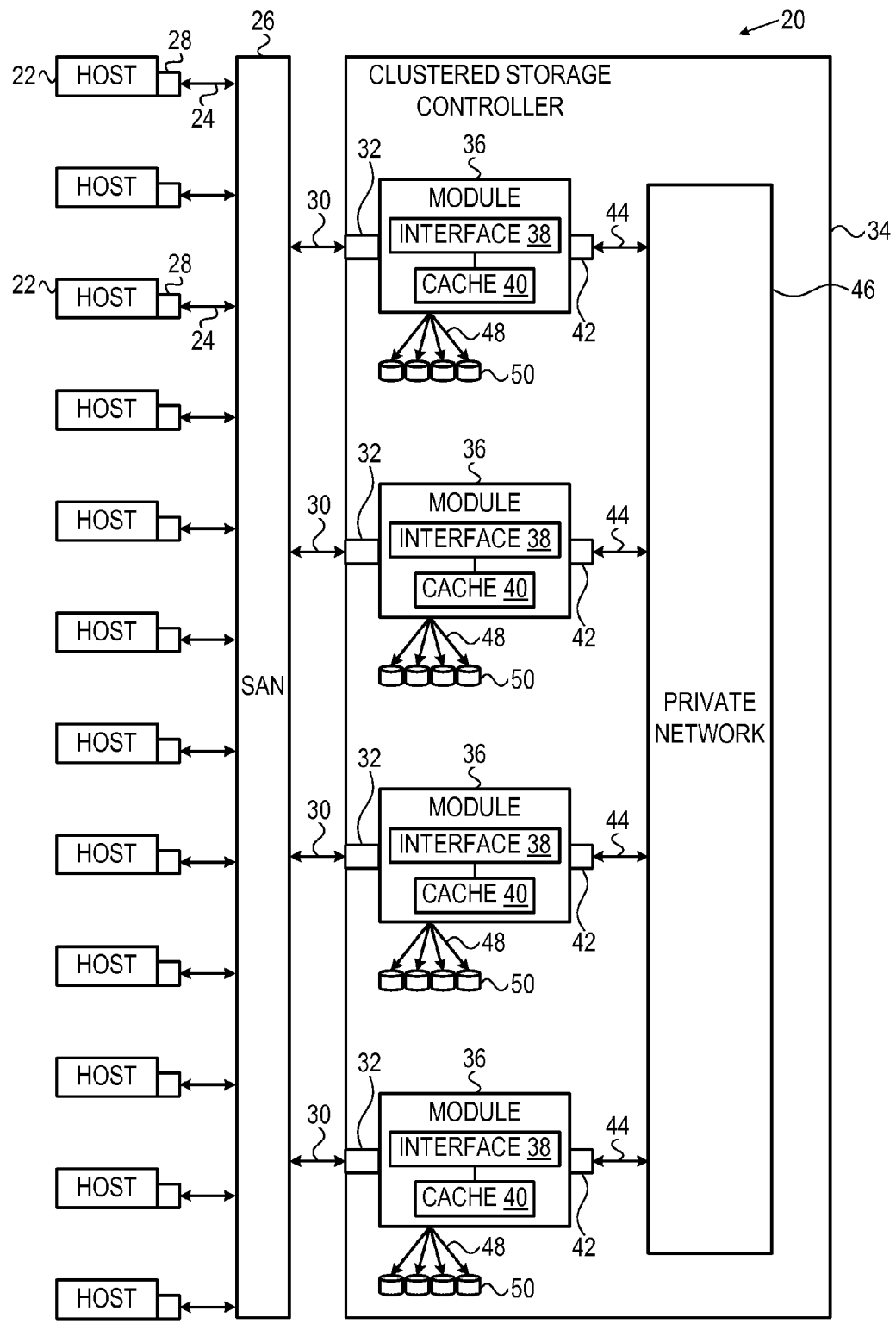
FIG. 1 is a schematic pictorial illustration of a storage system, in accordance with an embodiment of the present invention.

FIG. 1 is a schematic pictorial illustration of a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
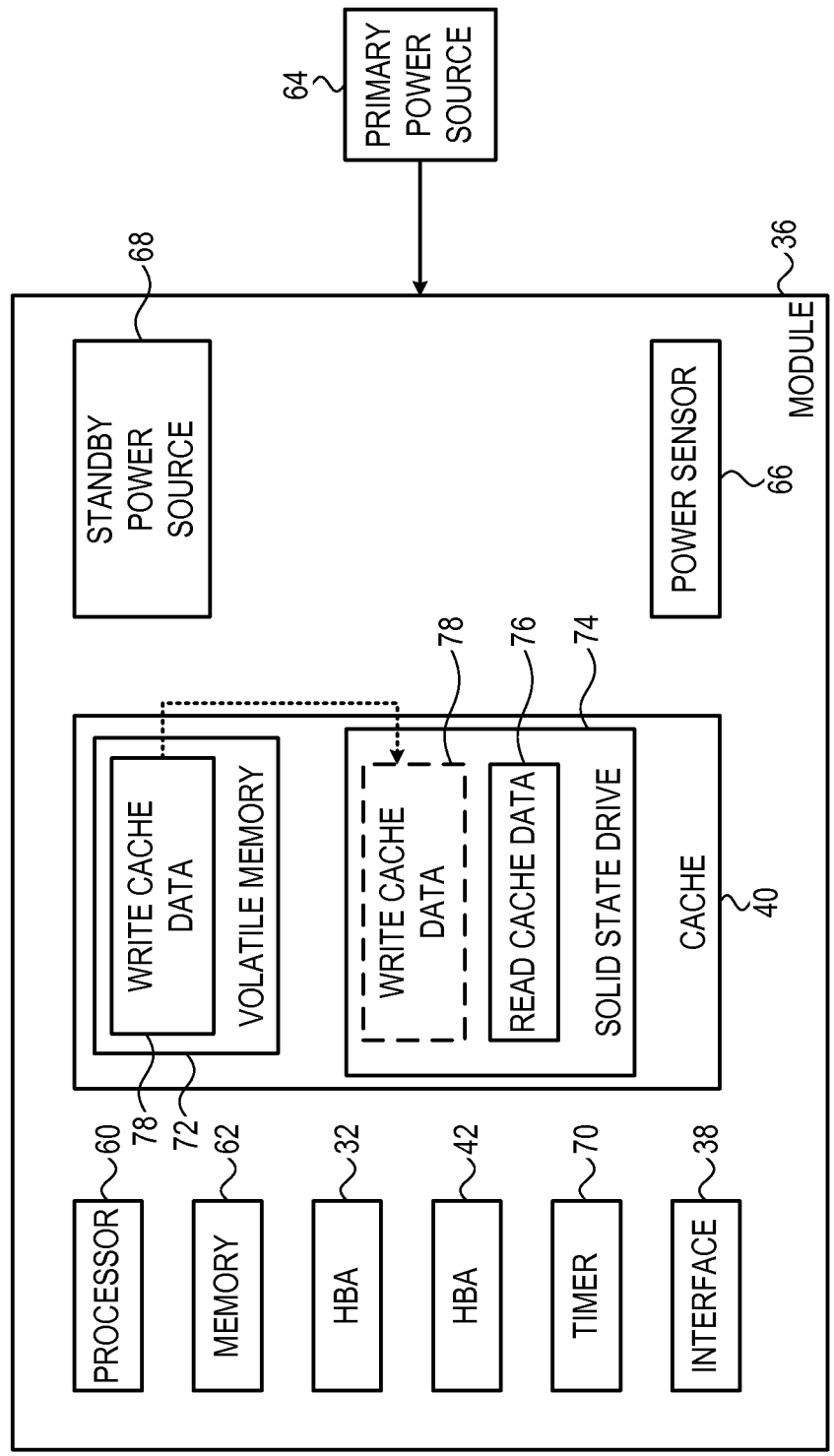
FIG. 2 is a schematic pictorial illustration of a module of the storage system that is configured to mitigate an impact of false power failure alerts, in accordance with an embodiment of the present invention.

FIG. 2 is a schematic pictorial illustration of module 36 configured to mitigate an impact of false power failure alerts, in accordance with an embodiment of the present invention. Module 36 comprises a processor 60 and a memory 62, and is powered by a primary power source 64 (e.g., an alternating current outlet). Module 36 also comprises a power sensor 66, a standby power source 68 and a timer 70. Upon detecting a failure of primary power source 64 (e.g., no power is detected from the primary power source), power sensor 66 is configured to convey a power alert signal to processor 60.

Upon receiving a power alert signal from sensor 66 indicating a failure of power source 64, processor 60 is configured to engage standby power source 68. Additionally, as explained hereinbelow, processor 60 may activate a timer 70 upon receiving the power alert signal. In alternative embodiments, timer 70 may comprise a software application (also referred to as a daemon) that processor 60 executes from memory 62.

Cache 40 comprises a volatile memory 72 and a solid state device such as a solid state drive (SSD) 74. Volatile memory 72 typically comprises high-speed memory such as dynamic random-access memory (DRAM) or static random-access memory (SRAM), which theoretically have an unlimited number of write/erase cycles. Since write cache data 78 may be updated frequently (i.e., the processor clears the write cache data once the write cache data is destaged to storage devices 50), processor 60 typically stores the write cache data to volatile memory 72 and configures the volatile memory as the write cache.

SSD 74 comprises memory elements (e.g., flash memory) that typically have a limited number of write/erase cycles (presently approximately 100,000 cycles). Due the limited number of write/erase cycles, processor 60 may configure SSD 74 to store read cache data 76, and may configure the SSD as the read cache.

In some embodiments, the memory elements in SSD 74 may comprise single-level cells that are configured to store one bit of data per memory element. In alternative embodiments, the SSD memory elements may comprise multi-level cells that are configured to store two or more bits of data in each of the memory elements.

Processor 60 typically configures volatile memory 72 as a write cache and SSD 74 as a read cache. When SSD 74 is configured as a read cache, processor 60 stores read cache data 76 to the volatile memory. In operation, when processor 60 receives a read request from a given host computer 22, and the requested data is stored in read cache data 76, then the processor retrieves the requested data from the read cache and conveys the data to the given host computer.

When volatile memory 72 is configured as the write cache, processor 60 stores write cache data 78 to the volatile memory. In operation, when processor 60 receives a write request from a given host computer 22, the processor stores the write request data to the write cache in volatile memory 72, and conveys an acknowledgement to the given host computer. The write request data can be destaged from volatile memory 72 to storage devices 50 at a later time.

As explained hereinbelow, there may be instances when processor 60 configures SSD 74 as the write cache (i.e., the SSD is configured as both the read cache and the write cache). In these instances, processor 60 copies write cache data 78 from volatile memory 72 to SSD 74, and upon receiving a write request from a given host computer 22, the processor stores the write request data to the write cache in SSD 74, and conveys an acknowledgement to the given host computer. The write request data can be destaged from SSD 74 to storage devices 50 at a later time.

Processor 60 typically comprises a general-purpose computer, which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 60 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Write Cache Reconfiguration

Figure 3:
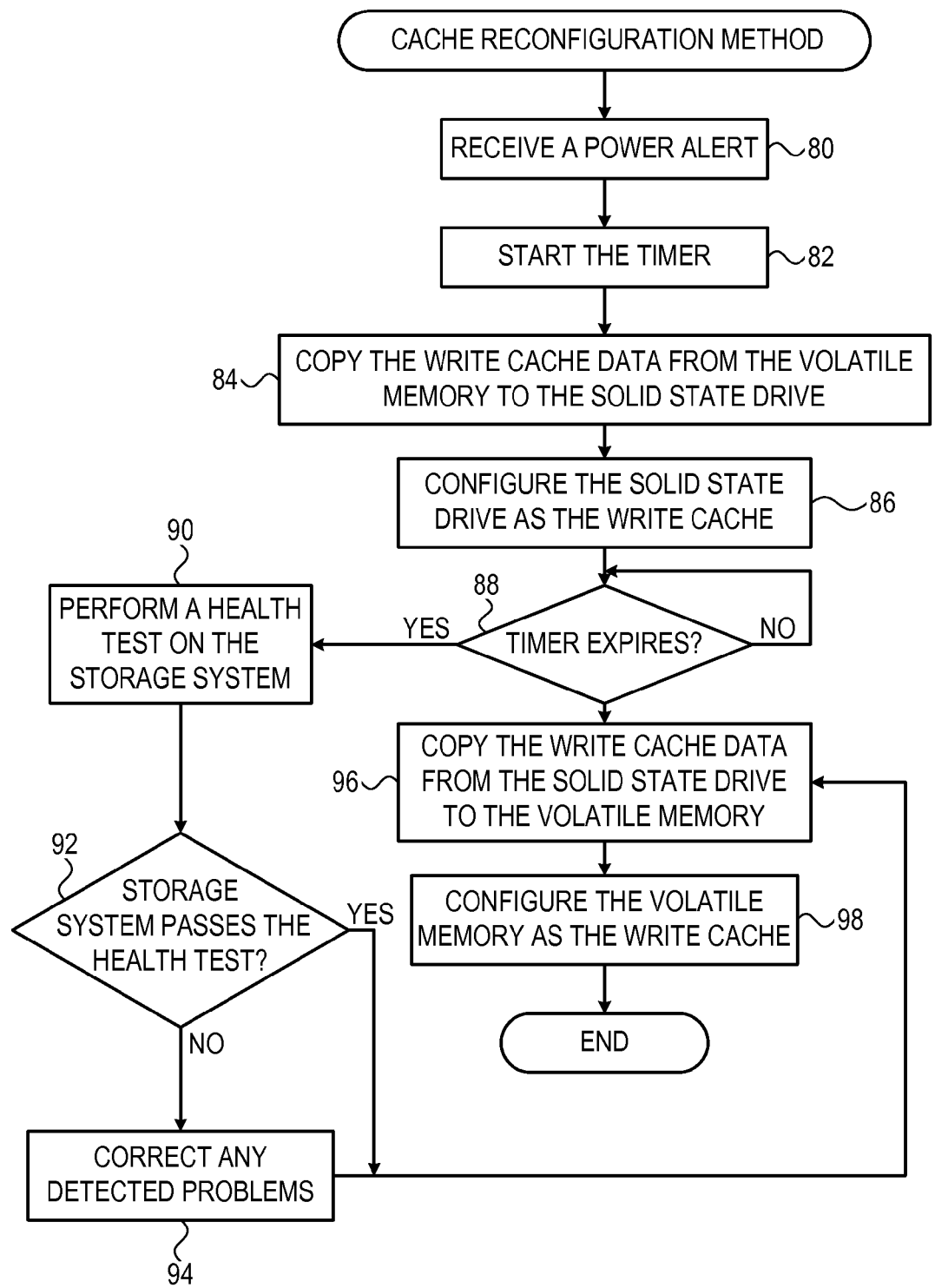
FIG. 3 is a flow diagram that schematically illustrates a method of reconfiguring a write cache, in accordance with an embodiment of the present invention.

FIG. 3 is a flow diagram that schematically illustrates a method of reconfiguring the write cache, in accordance with an embodiment of the present invention. In the embodiments described herein, volatile memory 72 is initially configured as a write cache and SSD 74 is initially configured as a read cache. In other words, processor 60 initially stores write cache data 78 to volatile memory 72 and read cache data 76 to SSD 74.

In an alert step 80, processor 60 receives a power alert signal from power sensor 66. The power alert can indicate a loss of power from primary power source 64, or a low power status for standby power source 68. In some embodiments, standby power source 68 comprises one or more batteries, and the low power status comprises the batteries having a low charge. If standby power source 68 has a low power status, the standby power source may not be able to provide module 36 with enough power to shut down without losing the write cache data stored in volatile memory 72.

In a timer step 82, processor 60 starts timer 70 upon receiving the power alert. In the embodiments described herein, timer 70 "expires" after a specific time period. In some embodiments, timer 70 can be configured to convey an expiration message to processor 60 when the timer expires. In alternative embodiments, processor 60 can monitor timer 70 to determine if timer 70 has expired.

The specific time period may be slightly longer than a time period that standby power source 68 can power module 36. For example, if standby power source 68 comprises one or more batteries that can power module 36 for fifteen minutes, the specific time period can be set to twenty minutes. Therefore, if timer 70 expires, then the power alert was probably a false alarm (or full power has been restored to module 36 from primary power source 64. On the other hand, if the power alert is real and power is not restored to module 36 from primary power source 64, then module 36 shuts down once standby power source 68 is exhausted (e.g., the batteries discharge completely).

In a first copy step 84, the processor copies write cache data 78 from volatile memory 72 to SSD 74. Using embodiments described supra, in a first configuration step 86, processor 60 configures SSD 74 as the write cache. In other words, SSD 74 is now configured as both the read cache and the write cache. When SSD 74 is configured as both the read cache and the write cache, module 36 is referred to herein as operating in a "power alarm mode."

Upon configuring SSD 74 as the write cache and receiving a write request from a given host computer 22, processor 60 conveys the write request data to write cache data 78 in SSD 74. Configuring SSD 74 as the write cache ensures that all write request data received is stored in a persistent state in the SSD. As described supra, upon receiving a write request from a given host computer 22, processor 60 conveys an acknowledgement after storing the write request data to write cache data 78. Therefore if the power alert is real and module 60 shuts down once standby power source 68 is exhausted, no data will be lost since data from all write requests that were acknowledged is stored either in SSD 74 or on storage devices 50 (i.e., after processor 60 destages write request data from the write cache to the storage devices).

As described supra, SSD 74 may comprise either single-level cells or multi-level memory cells (also referred to herein as single-layer SSDs and a multi-layer SSDs respectively). Multi-layer SSDs typically employ two overlapping blocks of non-volatile solid state memory in order to increase storage density. If a power interruption occurs during a write to the second block, data in both the second block and the first block may be corrupted, since metadata typically stored in the first layer may also be modified while writing to the second block. In embodiments of the present invention, processor 60 may write only to the first layer of the multi-layer SSD (i.e., SSD 74) when the SSD is configured as the write cache, thereby reducing a chance of any data loss if processor 60 is writing to the SSD when module 36 shuts down (i.e., once standby power source 68 is exhausted).

In some embodiments, processor 60 can limit (i.e., "throttle") writes to SSD 74 in order to reduce SSD wear (i.e., due to the limited number of write/erase cycles inherent to SSDs described supra). As described supra, storage devices 50 may be configured as LUNs. In order to reduce the wear on SSD 74 (and thereby increasing the operational life of the SSD), processor 60 may be configured to service write requests only for a specific subset of the LUNs when module 36 is operating in the power alarm mode.

In a first comparison step 88, if timer 70 expires, then the power alert was probably a false alarm. If timer 70 has not expired then the method continues looping back to the comparison step until either the timer expires or module 36 shuts down (i.e., once standby power source 68 is exhausted). If the timer expired, then in a test step 90, a system administrator (not shown) can initiate a health test on module 36. The health test can be performed by processor 60 or external hardware (not shown). The health test may comprise testing hardware components (e.g., storage devices 50, memory 62 and timer 70) and any software executing on processor 60 (i.e., from memory 62).

In a second comparison step 92, if module 36 passes the health test, then the power alert was a false alarm, and in a second copy step 96, processor 60 copies write cache data 78 from SSD 74 to volatile memory 72. In a second configuration step 98, processor 60 configures the volatile memory as the write cache, and the method ends. In other words, if the power alert was a false alarm, then processor 60 reconfigures the write cache back to its original configuration (i.e., the configuration prior to step 84).

Returning to second comparison step 92, if module 36 did not pass the health test, then in a correction step 94, the system administrator can correct any problems detected by the health test (e.g., replace a memory board), and the method continues with step 96.

In some embodiments, power sensor 66 may be configured to convey a subsequent message to processor 60 upon detecting that the previously conveyed power alert was a false alarm. Upon receiving the subsequent message, processor 60 can reconfigure the write cache (as described in steps 96 and 98) without waiting for timer 70 to expire.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A distributed storage system, comprising:
   a volatile memory configured as a write cache; and
   a processor configured to:
   receive a signal indicating a loss of power,
   start a timer, the timer configured to expire after a specific time period,
   copy write cache data from the volatile memory to a solid state device, upon receiving the signal indicating the loss of power to the storage system,
   configure, subsequent to copying the write cache data, the solid state device as both a read cache and the write cache,
   perform a health test on the storage system upon receiving the signal indicating the loss of power,
   determine the loss of power as a false alarm if the timer expires after one of configuring the solid state device as both the read cache and the write cache and the storage system passes a health test on the storage system upon receiving the signal indicating the loss of power, and
   upon the timer expiring and the storage system passing the health test, copy the write cache data from the solid state device back to the volatile memory.

2. The storage system according to claim 1, wherein the processor configures, subsequent to copying the write cache data to the volatile memory, the volatile memory as the write cache.

3. The storage system according to claim 1, wherein the solid state device comprises a non-volatile solid state memory.

4. The storage system according to claim 3, wherein the solid state device is selected from a list comprising a single-layer solid state drive (SSD) and a multi-layer SSD.

5. The storage system according to claim 4, wherein the processor is configured to copy the write cache data to the SSD by copying the write cache data to a first layer of the multi-layer SSD.

6. A computer program product, the computer program product comprising:
   a non-transitory computer readable storage medium having computer readable program code embodied therewith, the computer readable program code comprising:
   computer readable program code configured to configure a volatile memory configured as a write cache,
   computer readable program code configured to receive a signal indicating a loss of power,
   computer readable program code configured to start a timer, the timer configured to expire after a specific time period,
   computer readable program code configured to copy, in a storage system, write cache data from a volatile memory configured as a write cache to a solid state device, upon receiving the signal indicating the loss of power to the storage system; and
   computer readable program code configured to configure, subsequent to copying the write cache data, the SSD device as both a read cache and the write cache
   computer readable program code configured to perform a health test on the storage system upon receiving the signal indicating the loss of power,
   computer readable program code configured to determine the loss of power as a false alarm if the timer expires after one of configuring the solid state device as both the read cache and the write cache and the storage system passes a health test on the storage system upon receiving the signal indicating the loss of power, and
   computer readable program code configured to, upon the timer expiring and the storage system passing the health test, copy the write cache data from the SSD back to the volatile memory.

7. The computer program product according to claim 6, further comprising computer readable program code configured to configure, subsequent to copying the write cache data to the volatile memory, the volatile memory as the write cache.

8. The computer program product according to claim 6, wherein the solid state device comprises a non-volatile solid state memory.

9. The computer program product according to claim 8, wherein the solid state device is selected from a list comprising a single-layer solid state drive (SSD) and a multi-layer SSD.

10. The computer program product according to claim 9, wherein the computer readable program code is configured to copy the write cache data to the SSD by copying the write cache data to a first layer of the multi-layer SSD.

* * * * *